United States Patent [19]
Borrelli

[11] 3,726,039
[45] Apr. 10, 1973

[54] MINNOW PAIL

[76] Inventor: Patsy J. Borrelli, 104 Ambrose Street, Rochester, N.Y. 14608

[22] Filed: Feb. 24, 1971

[21] Appl. No.: 118,324

[52] U.S. Cl. ................................................43/56
[51] Int. Cl. ...........................................A01k 97/04
[58] Field of Search................................43/56, 57

[56] References Cited

UNITED STATES PATENTS

| | | | |
|---|---|---|---|
| 3,449,855 | 6/1969 | Hassell | 43/56 |
| 3,002,312 | 10/1961 | Barker | 43/56 |
| 2,294,136 | 8/1942 | Smith | 43/56 |
| 3,044,209 | 7/1962 | Roach | 43/56 |
| 3,068,607 | 12/1962 | Ward | 43/56 |
| 3,339,305 | 9/1967 | Smith | 43/56 |

*Primary Examiner*—Louis G. Mancene
*Attorney*—Samuel R. Genca

[57] ABSTRACT

A minnow pail is disclosed wherein minnows and other forms of bait are moved by gating means between two juxtaposed chambers, one of which is pressurized by a gas mixture or gas for supporting life such as oxygen and the other one of the chambers is opened at the top for withdrawing the bait from the pail and at the bottom for the passage of the bait between the juxtaposed chambers.

5 Claims, 8 Drawing Figures

PATENTED APR 10 1973 3,726,039

INVENTOR.
PATSY J. BORRELLI
BY
Samuel R. Genca
ATTORNEY

PATENTED APR 10 1973 3,726,039

INVENTOR.
PATSY J. BORRELLI
BY Samuel R. Genca
ATTORNEY

MINNOW PAIL

BACKGROUND OF THE INVENTION — FIELD OF INVENTION

This invention relates to bait handling equipment and more particularly to a novel minnow pail having means for sustaining bait life for relatively long periods of time.

PRIOR ART

Minnow pails are well known to those skilled in the art and fishermen in general. Prior art minnow pails have included means for aerating water contained in the pail to prolong and sustain bait life. Such prior art means have included pumps, paddles and sprays to mix air with the water in the pail.

Aerating of water in minnow pails may have been satisfactory in the past because of the short distance between the bait shop and the fishing area and the relatively short time the bait was in the minnow pail. However, today, due to over-population and water pollution, good fishing areas, streams, lakes and rivers are greater distances from the cities and these greater distances must be traveled and as a result much time is required to reach good fishing areas. Thus there is now a pressing need to keep bait alive and fresh for a longer period of time in a minnow pail.

SUMMARY OF THE INVENTION

Briefly described, a minnow pail in accordance with a preferred embodiment of the invention includes two juxtaposed chambers in the upper portion of the pail communicating with the lower portion of the pail. One of the chambers is closed at the top while the other chamber is open at the top and bottom so that liquid communicates with both chambers and the one chamber can be filled with oxygen under pressure acting against the head of water contained in the other one of the juxtaposed chambers. A gating means is disposed in cooperative relationship with the juxtaposed chamber for selectively moving the bait or minnows between the oxygen filled chamber and the open chamber so that the minnows can breathe the life sustaining oxygen or be readily available in the open one of the chambers as bait.

DESCRIPTION OF THE DRAWINGS

The invention, both as to its organization and method of operation will best be understood by reference to the following detailed description taken in connection with the accompanying drawings, in which.

DETAILED DESCRIPTION

Figure 1:
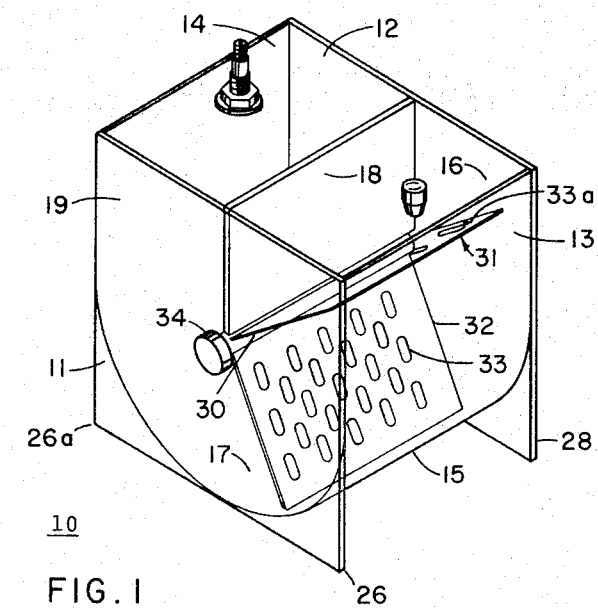
FIG. 1 is a perspective view of a minnow pail in accordance with a preferred embodiment of the invention.

Referring now to the drawings and more particularly to FIGS. 1–4, a minnow pail 10 in accordance with a preferred embodiment of the invention is shown. The minnow pail 10 is illustrated and made of clear plastic such as Lucite or Plexiglas manufactured by the DuPont Company to more clearly show the details of the invention. It should however be understood that other plastic materials such as propylene, polyethylene or metals such as aluminum and galvanized iron may be used without departing from the invention. The minnow pail 10 may be molded, vacuum formed or fabricated of the aforesaid materials. The minnow pail 10 includes a pair of vertical spaced apart side walls 11, 12 connected to another pair of end walls 13, 14 which are connected to a curved bottom wall 15 of the pail 10 which define the lower portion of the pail 10. The pail 10 includes a vertical partition 18 disposed in the sealing relationship to the side walls 11, 12 and spaced from the curved bottom wall 15. The vertical partition 18 is disposed in the upper portion 16 of the pail 10 and divides the upper portion 16 into juxtaposed chambers 19, 21.

The juxtaposed chambers 19, 21 are rectangular in cross section in the preferred embodiment of the invention taken in a vertical or horizontal plain (not shown) taken through the minnow pail 10. The bottom wall 15 has a uniform curve, a simi-circle with a radius extending from a shaft 30 to end wall 13 and to end wall 14 and is spaced from the partition 18 to define a lower portion of the pail 10 which lower portion communicates with the juxtaposed chambers 19, 21. Chamber 21 is open at the upper portion 16 and at the lower portion 17 of the pail 10. The other chamber 19 is closed at the upper portion 16 by a cover plate 22 but is open at the lower portion 17 of the pail 10 so that water disposed in the one chamber 21 and lower portion 17 encloses the chamber 19.

The minnow pail 10 includes a valve 23 fixed to the cover plate 22 so as to provide a means for applying a life sustaining gas, such as oxygen under pressure to the chamber 19. The valve 23 shown is the same as the type used in automobile tires, however, other valving means may be used to apply a gas under pressure to the chamber 19 without departing from the invention.

The pressurized gas in the chamber 19 acts against the water in the lower portion 17 of the pail 10 and the chamber 21. The pressure of the gas confined in the chamber 19 is dependent upon the height of the water in the chamber 21 viz. head of water. Thus it is desirable to maintain a full head of water in chamber 21.

In accordance with the invention, the minnow pail 10 includes a gating means 31 for selectively moving minnows 41 between the chamber 21 and the gas filled chamber 19 through the lower portion of the pail 10. The gating means 31 includes the shaft 30 rotatably mounted on the partition 18 and a pair of spaced apart baffles 32 and 33a radially fixed to the shaft 30. The baffles 32 and 33a are radially fixed to the shaft approximately 90° apart so that the minnows 41 can be held captive within chamber 21 or chamber 19 and moved therebetween. The baffles 32 and 33a include elongated holes 33 for the flow of water and to facilitate the movement of the baffles. Thus the minnows 41 are readily available for extration as bait in chamber 21 and are kept alive and fresh in chamber 19 since they are exposed to the life sustaining oxygen in chamber 19 and water in the lower portion 17 of the pail 10. The shaft 30 extends outside of the side wall 11 through a water seal packing (not shown) such as an O-ring well known to those skilled in the art to prevent the loss of water from the pail 10. A knob 34 is coupled to the shaft 30 for rotating the shaft 30 and baffles 32 and 33a and thus direct the minnows 41 between the chambers 19 and 21. The side wall 11 is transparent so that the position of the baffles 32 and 33a may be seen at all times; however, if the minnow pail 10 is made of materials which are not transparent, then the knob 34 can be marked with a reference mark (not shown) to indicate the position of the baffles 32 and 33a and the minnows 41.

The minnow pail 10 includes pedestals 26, 26a on side wall 11 and pedestal 28 on side wall 12 for resting the minnow pail 10 on a surface and a bail or handle 40 for carrying the minnow pail 10.

The minnow pail 10 also includes a cover 24 for covering the open chamber 21. The cover includes a knob 25 for raising or lowering the cover 24 which is hinged at 24a.

In the operation of the minnow pail 10, the valve 23 is opened to bleed air out of the chamber 19 while water is being applied to chamber 21. When water starts to leave by way of valve 23 and chamber 21 is filled with water, valve 23 is closed. Life sustaining gas, such as oxygen, is then applied under pressure to chamber 10 by way of valve 23 against the head of water in chamber 21. Chamber 19 is filled with gas to a level above the shaft 30. Gas filled beyond the level of the shaft 30 will escape to pass shaft 30 to chamber 21 and the atmosphere. Thus a head of water should be maintained in chamber 21 and the level of water in chamber 19 should be slightly higher than the level of the shaft 30 so that gas will stay in chamber 19.

Figure 2:
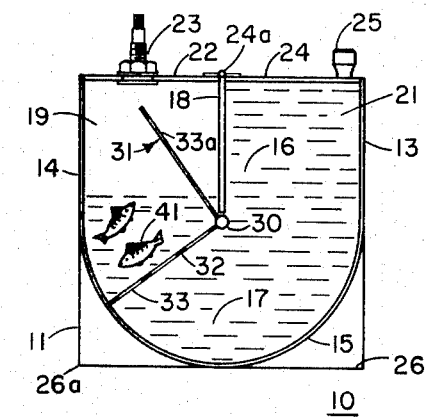
FIG. 2 is a side view of the minnow pail of FIG. 1 in one mode of operation.
Figure 3:
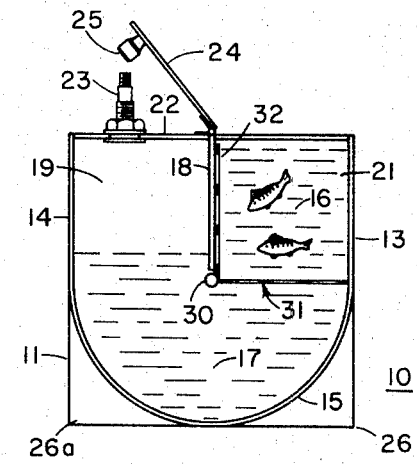
FIG. 3 is a view similar to FIG. 2 showing another mode of operation of the minnow pail of FIG. 1.
Figure 4:
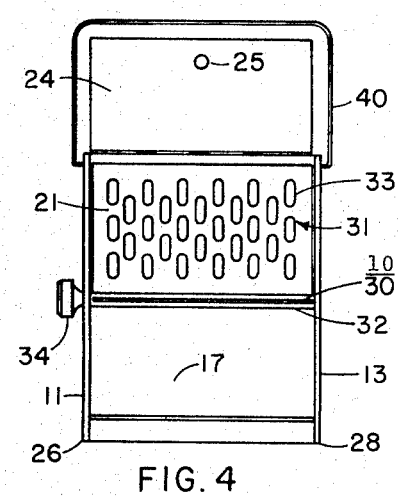
FIG. 4 is an end view of the minnow pail of FIG. 1.

In loading the pail 10 with minnows 41, the gating means 31 is positioned in the manner or mode shown in FIG. 3, that is the baffle 32 is substantially horizontal while the baffle 33a is substantially vertical and the minnows 41 are disposed between the baffles 32, 33a in chamber 21. The minnows 41 can remain in the chamber 21 when they are required as bait. However, when the minnows 41 are transported or are required to be in the pail 10 for a long period of time, the minnows 41 are transferred to chamber 19 and to the life sustaining oxygen in chamber 19 by rotating shaft 31 by knob 34 and the baffles 32, 33a into the position as shown in FIG. 2. In this position, the minnows 41 are exposed to the oxygen in the chamber 19. It has been found desirable to urge the minnows 41 toward the oxygen for a longer and fresher life by baffle 32. The minnows 41 can, of course, be returned to the chamber 21 by rotating the knob 34, shaft 30 on the baffles 32, 33a. The baffles 32 and 33a are substantially equal to the radius of the curved bottom 15 wall so that the minnows are swept through the lower portion of the pail 10.

Referring now to FIGS. 5–8, another minnow pail 50 in accordance with the invention is shown. The minnow pail 50 accomplishes the same purpose and function that the minnow pail 10 accomplishes in accordance with the invention. That is the minnows 41 are readily available to use as bait in one of the juxtaposed chambers, namely chamber 21, or they may be transferred to the other oxygen filled juxtaposed chamber 19 of the minnow pail 10 or in the corresponding juxtaposed chambers 57 and 56 in the minnow pail 50. The difference between the minnow pail 50 and the minnow pail 10 will be described hereinafter.

The minnow pail 50 includes side wall 51 connected to a flat round bottom wall 52. The minnow pail 50 includes an upper portion 53 and a lower portion 54. A partition 55 disposed in the upper portion 53 divides the minnow pail 50 into two juxtaposed chambers 56 and 57. The partition 55 is connected in sealing relationship to the side wall 51. The chamber 57 is open at 75 in the upper portion 53 and at the lower portion 54 of pail 50. The chamber 56 is closed at the upper portion 53 by a cover 58 which is in sealing relationship with the partition 55 and side wall 51. The chamber 56 is open at the lower portion 54 of the pail 50. Water placed in the pail 50 through chamber 57 communicates with the chamber 56 through the lower portion 54 of the pail 50 and also provides a means of sealing off the chamber 56 in the lower portion of the pail 50.

The minnow pail 50 includes a valve 59 fixed to the cover 58 in a manner similar to the valve 23 of the minnow pail 10. The valve 59 may be used to apply the life sustaining gas such as oxygen to the chamber 56 or to bleed air and water from the chamber 56 so that the aforesaid oxygen may be applied under pressure to the chamber 56 in accordance with the invention.

Figure 6:
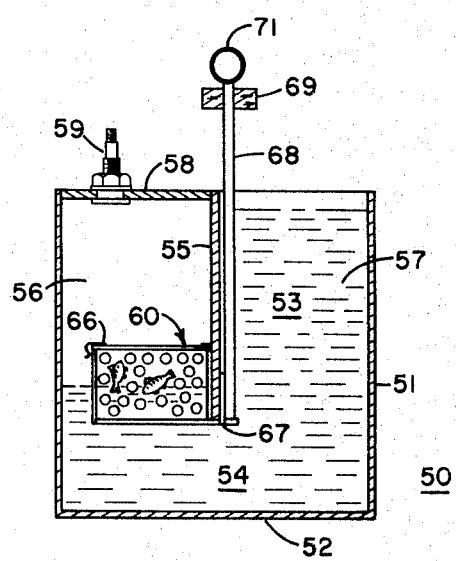
FIG. 6 is a vertical side sectional view of the minnow pail of FIG. 5 in one mode of operation.
Figure 7:
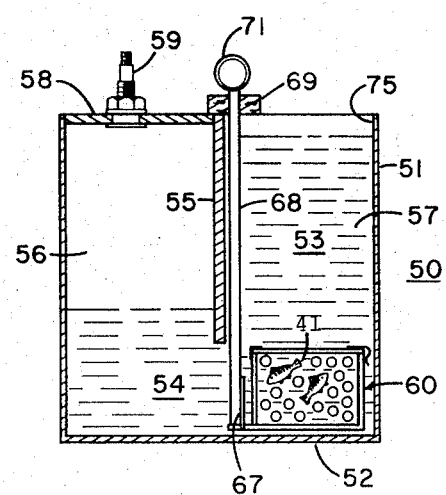
FIG. 7 is a vertical side sectional view similar to FIG. 6 showing the minnow pail of FIG. 5 in another mode of operation.
Figure 8:
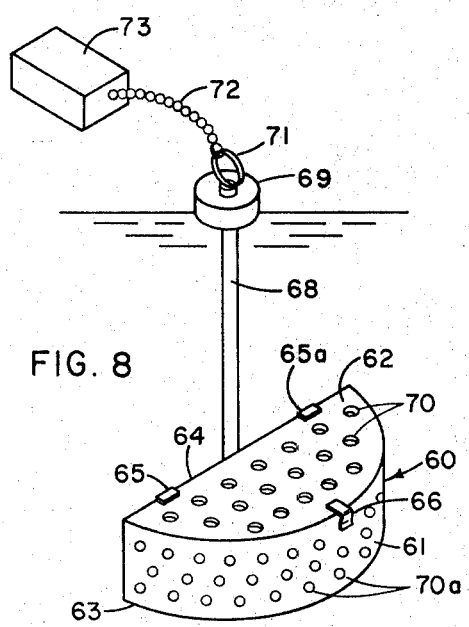
FIG. 8 is a flowing minnow box which is part of the minnow pail for FIG. 5.

The minnow pail 50 includes a minnow box gating means 60 shown in greater detail in FIG. 8. The gating means 60 includes a minnow box 61, a shaft means 68 for turning or rotating the minnow box 61 and locking spring matches 67, 67a for clipping the minnow box 61 to the partition 55 in a manner to expose the minnows 41 to oxygen in the chamber 56 as shown in FIG. 6. The minnow box 61 includes a hinge mounted perforated cover 62 connected to hinges 65 and 65a which are connected to a back portion 64. The cover 62 is locked to curved side wall 63 of the minnow box 61 by a spring clip 66. The minnow box 61 includes perforations 70, 70a in cover 62 and side wall 63 so that water or the gas in the chamber 56 may flow through the minnow box 61. As shown in FIG. 8, the minnow box 61 may be removed from the minnow pail 50 and inserted in the fishing area to keep the bait or minnows 41 alive and fresh. For this purpose, a float 69 and an anchor 73 with a chain 72 are connected to a ring 71 on the shaft 68 so as not to lose the minnow box 61 and to keep it buoyant.

In the operation of the minnow pail 50, the chamber 56 is filled with oxygen in a similar manner to the chamber 19 of the minnow pail 10. That is the valve 59 is open to bleed air and water to fill the juxtaposed chambers 56 and 57 with water. Once chamber 56 is void of air and filled with water, oxygen under pressure is applied through the valve 59 into the chamber 56 against the head of water in chamber 57. Excess water from the chamber 56 is displaced by the pressurized oxygen through the chamber 57. The level of water in the chamber 56 should be maintained above the partition 55 in the lower portion 54 so that oxygen will not escape into chamber 57 and the atmosphere.

Figure 5:
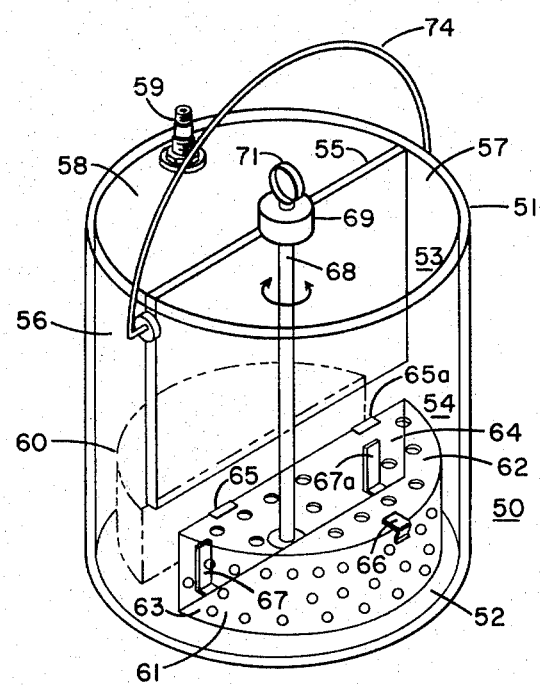
FIG. 5 is a perspective view of another minnow pail in accordance with another embodiment of the invention.

After the chamber 56 is filled with oxygen in the manner described above, the bait or minnows 41 are placed in the minnow box 61 and the box 61 is inserted in the chamber 57 and lowered to the lower portion 54 of the minnow pail 50. The minnows 41 may be kept in this position for quick accessibility. If the minnows 41 are to be kept for a long period of time, the minnow box 61 should be rotated 180° and raised by the ring 71 and shaft 68 until the minnow box 61 is locked to the partition by the spring latches 67, 67a as shown in FIG. 6. In this position the minnows 41 are exposed in the water and oxygen in chamber 56. In FIG. 5, the minnow box gating means 60 is shown by solid lines and the rotated positions of the minnow box gating means 60 are shown by dotted lines.

In summary, this invention provides a novel way of keeping bait such as minnows 41 alive and fresh for longer periods of time over prior art bait equipment and yet is easy to use and maintain and may be manufactured at a relatively low cost. The minnows 41 in accordance with the invention are exposed to the life sustaining oxygen rather than using prior art techniques of aerating the water disposed in the minnow pail.

It will be apparent that many changes and modifications of the several features described herein may be made without departing from the spirit and scope of the invention. It is, therefore, apparent that the foregoing description is by way of illustration of the invention rather than limitations of the invention.

What is claimed is:

1. In a minnow pail having an upper portion and a lower portion along a vertical axis of said pail, the combination comprising:
   a. partition means including a vertical partition dividing said upper portion into first and second chambers communicating with each other at said lower portion,
   b. pressure means coacting with said partition means for pressurizing one of said first and second chambers with a gas when said other one of said first and second chambers and said lower portion contains a liquid therein, and
   c. gating means for directing minnows between said first and second chambers so that said minnows are selectively exposed to said gas,
      i. said gating means includes a perforated box for containing said minnows therein for movement between said first and second chambers,
      ii. said box includes means for fastening said box to said partition so that said minnows are disposed partly in said liquid and partly in said pressurized one of said first and second chambers,
      iii. said gating means further includes a vertical rod fixed to said perforated box and extending beyond said upper portion of said pail for moving said box between said first and second chambers.

2. The invention defined in claim 1 wherein said gas is a gas mixture for supporting life.

3. The invention defined in claim 1 wherein said gas is oxygen.

4. The invention in claim 1 wherein said pressure means includes a valve for applying said gas to said one of said first and second chambers.

5. In a minnow pail having an upper portion and a lower portion along a vertical axis of said pail, the combination comprising:
   a. partition means including a vertical partition dividing said upper portion into first and second chambers communicating with each other at said lower portion,
   b. pressure means coacting with said partition means for pressurizing one of said first and second chambers with a gas when said other one of said first and second chambers and said lower portion contain a liquid therein, and
   c. gating means for directing minnows between said first and second chambers so that said minnows are selectively exposed to said gas,
      i. said gating means includes a perforated box having a hinged mounted lid for containing said minnows therein for movement between said first and second chambers,
      ii. said gating means further includes a vertical rod fixed to said perforated box and extending beyond said upper portion of said pail for moving said box between said first and second chambers.

* * * * *